Jan. 18, 1949.   J. P. BROWN   2,459,495
GYROSCOPIC CONTROL APPARATUS
Filed July 14, 1944   3 Sheets-Sheet 1
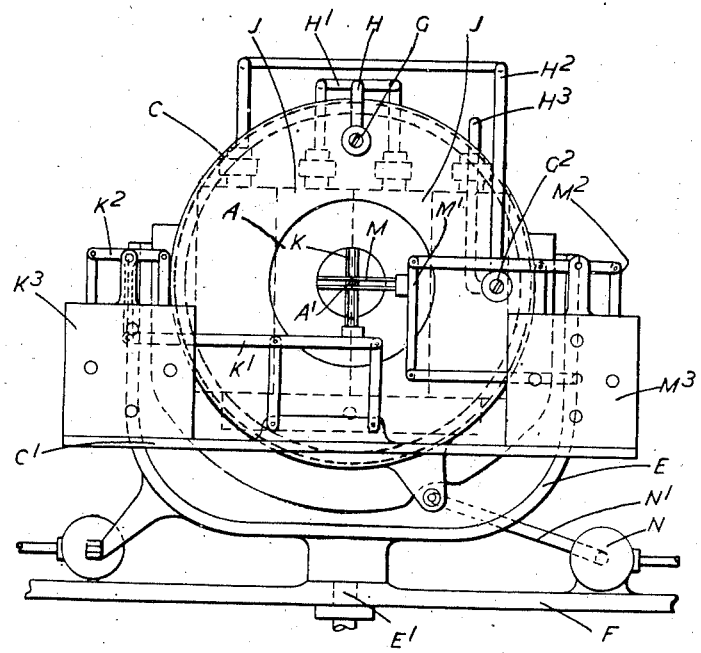
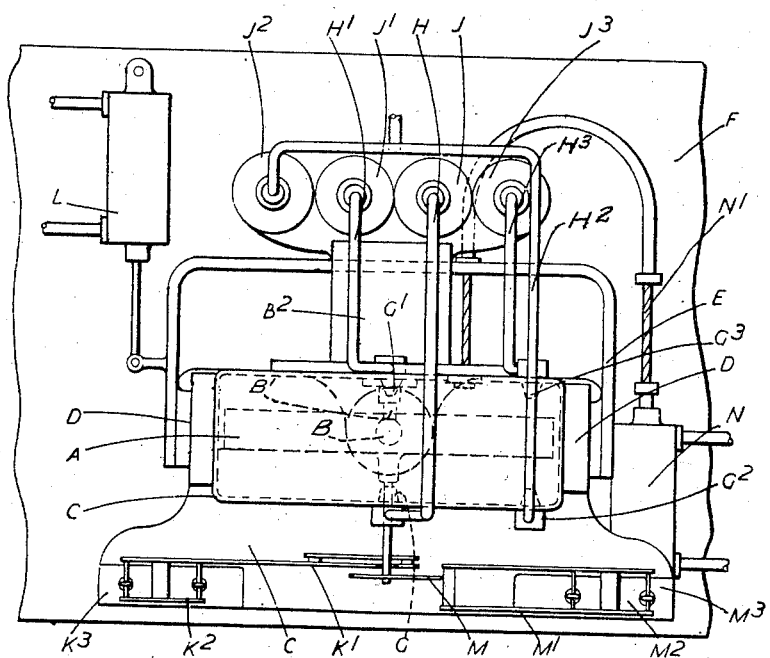
Inventor
JOHN POLLOCK BROWN
By
Emery Holcomb & Blair
Attorney Jan. 18, 1949. J. P. BROWN 2,459,495
GYROSCOPIC CONTROL APPARATUS
Filed July 14, 1944 3 Sheets-Sheet 2
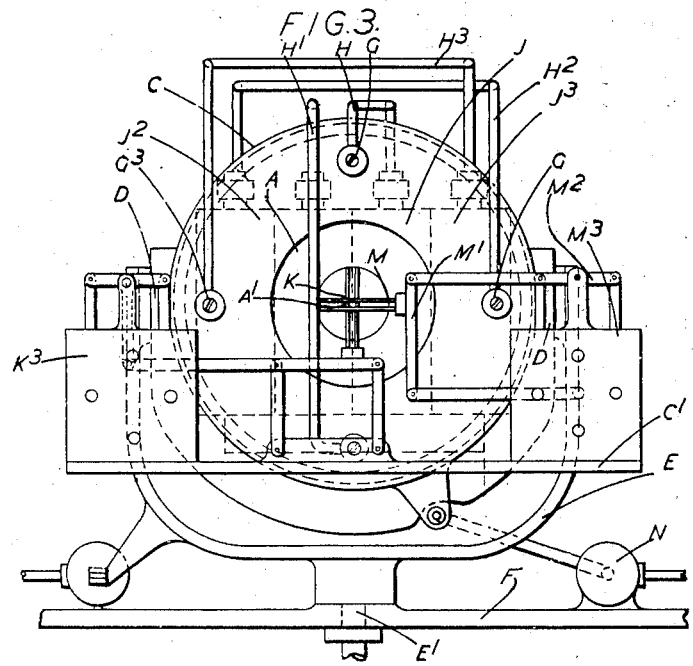
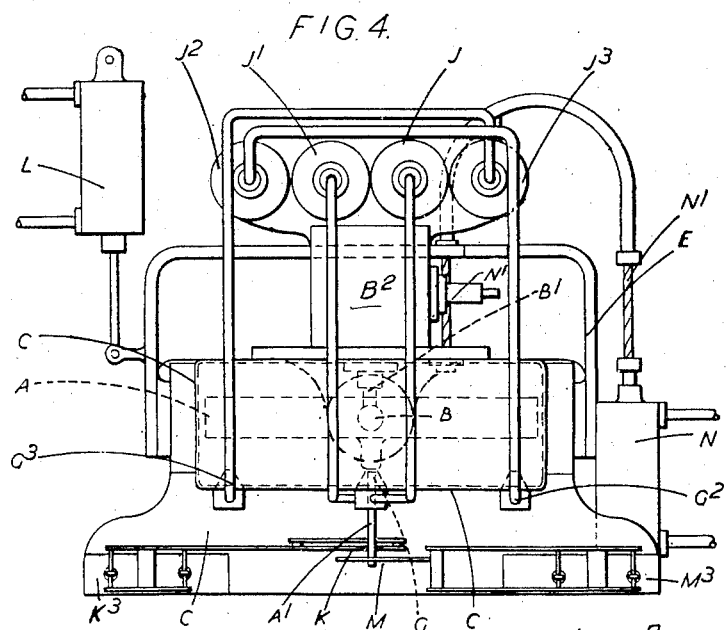
Inventor
JOHN POLLOCK BROWN
By
Emery Holcombe & Blair
Attorney Jan. 18, 1949.  J. P. BROWN  2,459,495
GYROSCOPIC CONTROL APPARATUS
Filed July 14, 1944  3 Sheets-Sheet 3
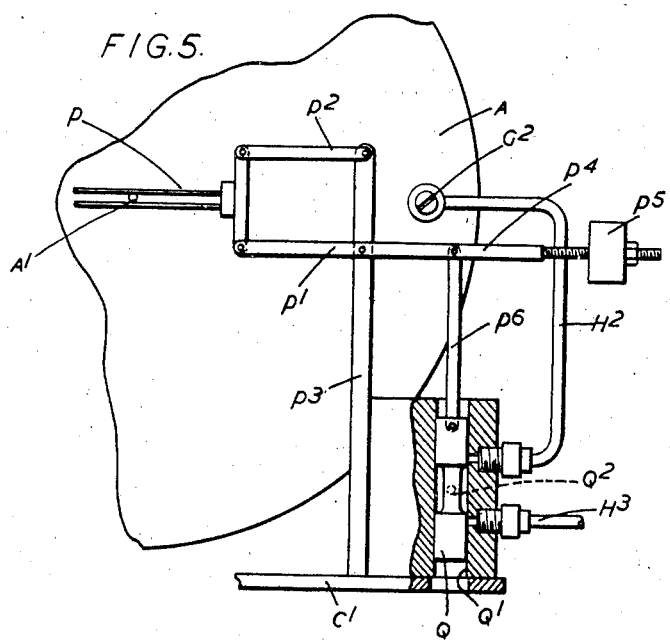
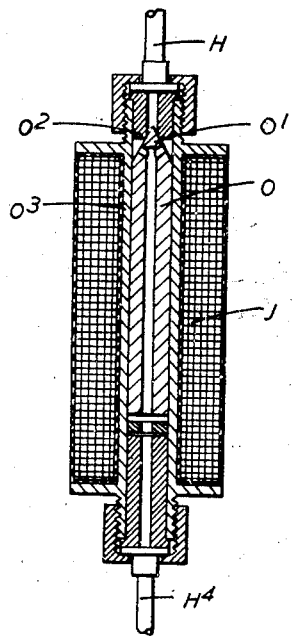
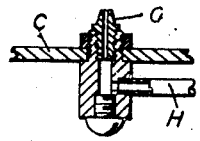
Inventor
JOHN POLLOCK BROWN
By
Emery Holcombe & Blair
Attorney Patented Jan. 18, 1949

2,459,495

UNITED STATES PATENT OFFICE 2,459,495

GYROSCOPIC CONTROL APPARATUS

John Pollock Brown, Croydon, England

Application July 14, 1944, Serial No. 544,943
In Great Britain April 30, 1943

11 Claims. (Cl. 74—5)

This invention relates to gyroscopic control apparatus applicable to air and other craft. An example of the apparatus to which the invention may be applied is described in the specification of the present inventor's United States of America Letters Patent No. 2,036,914, though it is to be understood that it may be used with other constructions of gyroscopic apparatus employed for like purposes.

In the construction described in the specification of the above mentioned patent the rotor of the gyroscope is mounted with a spherical cup bearing on a ball carried on the end of a spindle which is driven by suitable means the drive being transmitted by slipping fluid friction to the rotor so that the latter is free to change its angular position with respect to the driving spindle. The rotor with its driving spindle and the valves controlling servomotors are mounted on a cradle which is itself supported so as to be movable about two axes at right angles to each other on a base plate. The rotor controls the valves of servomotors which move the cradle about each of these axes which may be referred to as the axes of control. On deflection of the base plate, that is to say of the craft in which the apparatus is mounted, these servomotors operate to bring the driving spindle again into alignment with the axis of the rotor and in so doing the valves of the servomotors are restored to their normal positions. At the same time and through suitable servomotor mechanism the navigating controls of the craft are actuated in such a sense as to keep the desired attitude of the craft, that is to maintain the craft on its course and so correct deviations in azimuth, and in the case of an aircraft also to correct movements which may occur respectively about longitudinal and transverse axes.

Usually the orientation of the rotor of the gyroscopic apparatus will remain unaltered at least for some time while the craft continues on the same course and, if an aircraft, its attitude is to remain unchanged. It is desirable, however, to be able to alter the attitude of the craft either manually or by some separate controlling means such as the compass, a wireless beam, or a photo-electric or acoustic device. In the specification of the present inventor's United States of America Letters Patent No. 2,146,620 there has been described one way by which such alteration can be effected by exerting on a small armature carried by the rotor of the gyro an electro-magnetic influence so that precession of the rotor will be brought about in a selective manner and in accordance with the desired change in attitude whether this is in azimuth or about a horizontal axis. The present invention has for its object to provide other and alternative apparatus for effecting this change by causing the necessary precession of the rotor.

According to this invention precessing of the rotor is effected under control by the action of jets of fluid directed against one or both faces of the rotor. The nozzles from which these jets are delivered may be variously disposed so that the jets can act on either one face only of the rotor or on both faces and are arranged to effect precession in azimuth only or both in azimuth and also about a horizontal axis. A convenient procedure is for the nozzles delivering the jets of fluid to be arranged in pairs and in one face the nozzles in a pair are disposed in similar positions oppositely and substantially coaxially so as to act on the opposite faces of the rotor and in a direction approximately parallel to the axis of the driving spindle, the jets from one pair of nozzles being operative for each axis of control. Alternatively all the jets may act on the same face of the rotor with each pair of nozzles delivering parallel jets and disposed in diametrically opposite positions with respect to and equidistant from the axis of the rotor, each jet in a pair being operative to effect precessing in one direction or the other about the same axis of control.

It may be convenient to employ for these jets the same fluid, for example oil, which is used to impart rotation to the rotor and this provides a means of correlating the respective energies of the jets so that the rate of angular precession may be constant. The arrangement permits of a remote control of the jets, if necessary on a time basis. By a suitable disposition of the jets their selective action need not be adversely affected by any temporary deflection of the rotor about its axis.

In applying the invention to gyroscopic directional control apparatus of the particular type described in the specifications of the patents mentioned above, the jet nozzles may be mounted on the cradle which supports the spindle for driving the rotor and they are placed at the same radial distance from the axis of that spindle.

The control of each jet is effected in some convenient way by the operation of a valve of suitable type actuated selectively as for instance by electric means. The control of the jets in a pair may, however, be effected automatically.

The accompanying drawings illustrate diagramatically and by way of example how the invention may be carried out in practice and as applied to directional control apparatus of the the type described in the specifications of the patents above referred to. In these drawings, Figure 1 is an end view of the improved apparatus showing one arrangement of the jets for effecting precession of the rotor of the gyroscope.

Figure 2 is a plan of this apparatus.

Figures 3 and 4 are similar views showing an alternative arrangement of the jets.

Figure 5 shows an arrangement in which jets to effect precession are controlled automatically in association with pitch movements of the craft in which the apparatus is mounted.

Figure 6 is a sectional elevation of a solenoid-actuated valve which may be used for controlling the flow of fluid to the jets in the constructions shown in Figures 1, 2 and 3.

Figure 7 is a sectional elevation of one of the jets.

As in the known constructions above mentioned, the rotor A of the gyroscope is driven with slipping fluid friction through a cup carried by the rotor and enclosing a ball B mounted on the end of a spindle $B^1$ which is driven by suitable mechanism disposed in a casing $B^2$. Conveniently a turbine driven by oil under pressure is used for this purpose. The casing $B^2$ with the driving mechanism is mounted at the side of a casing C enclosing the rotor A and this casing is carried in trunnions D by a U-shaped member E forming a cradle which is itself provided on its under side with a spindle $E^1$ rotatable about a vertical axis in bearings in a base plate F. Thus the casing with the rotor can be swung in azimuth about the spindle $E^1$ and also about the horizontal axis of the trunnions D.

Referring to Figures 1 and 2, in order to effect precession as necessary for alteration of the course of the craft in which the apparatus is installed, there are provided two jet nozzles $GG^1$ which form a pair and are fixed in the casing C on opposite sides of the rotor A the jet axes being in line and parallel to the axis of the driving spindle $B^1$. To these jet nozzles fluid, conveniently oil under pressure, can be supplied through pipes $HH^1$ the flow of this oil being separately controlled by valves which are preferably actuated by electric means, as shown for example in Figure 6, the valve being disposed in and actuated by solenoids $JJ^1$ mounted on the back of the casing $B^2$. Precession in one direction or the other about the axis of the vertical spindle $E^1$ will be caused as a jet of fluid is impelled from the nozzle G or $G^1$ against one face or the other of the rotor A.

It will be appreciated that deviation from its course of the craft in which the apparatus is mounted will be automatically corrected by the action of the gyro rotor in the manner described in the specifications of the prior patents referred to above. The arrangement comprises an arm $A^1$ projecting from the centre and along the axis of the rotor A this arm engaging a light fork K which extends transversely in a vertical direction with respect to the rotor axis. If the craft deviates from its course the rotor acting through the arm $A^1$ will move the fork K and through a linkage $K^1$ and levers $K^2$ actuate valves in a casing $K^3$ and controlling a servomotor L on the base plate F through the operation of which a follow-up or restoring swinging is given to the cradle E about its spindle $E^1$ and at the same time the rudder of the craft is moved so as to bring the craft back on to its course. If, however, the course is to be deliberately altered, precession of the rotor in one direction or the other about the axis of the spindle $E^1$ is caused by permitting a jet from the nozzle G or $G^1$ to act on one of the faces of the rotor A. This will lead to a corresponding alteration of the rudder which will be effected automatically through the rotor arm $A^1$ moving the fork K and so actuating the servomotor valves as the rotor precesses.

Where the apparatus is mounted in an aircraft it may be desirable to provide similar means whereby alteration in attitude may be effected. For this purpose another pair of jet nozzles $G^2G^3$ are arranged oppositely and coaxially in the same way, but in a radial position relative to the rotor axis at right angles to the position of the jet nozzles $GG^1$ so that jets issuing from these nozzles will cause precession of the rotor about the horizontal axis of the trunnions D. The liquid, preferably oil, for these jets is supplied through pipes $H^2H^3$ and the flow is controlled by valves actuated by solenoids $J^2J^3$. The necessary movements are transmitted by the rotor arm $A^1$ when it deviates in the vertical direction and acts on a horizontal fork M which when moved and operating through a linkage $M^1$ and lever $M^2$ actuates valves disposed in a casing $M^3$. These valves control a servomotor N which is mounted on the base plate F and acting through a cable $N^1$ can swing the rotor casing C about the horizontal axis of the trunnions D in the known manner and at the same time move the controls which cause change of attitude of the aircraft. The valve casings $K^3$ and $M^3$ are mounted on a plate $C^1$ carried by the casing C.

It will be convenient here to refer to these electrically operated valves of which one is shown in Figure 6 of the drawings. The valve itself is constituted by a hollow member O with a conical end $O^1$ adapted to engage a seating $O^2$ in the end of a cylindrical casing $O^3$ within which the member O can slide freely. Liquid flows through the pipe H to a jet nozzle being supplied from a suitable source under pressure through the pipe $H^4$ to the interior of the cylinder $O^3$. The valve member O forms the moving core of a solenoid winding J disposed on and around the cylinder $O^3$. When current is permitted to flow to the solenoid the valve $O^1$ will be lifted off its seat and liquid will flow to the jet nozzle controlled by this valve and the desired precession of the rotor A and consequent alteration of the course will result.

A suitable construction of a jet nozzle and manner of mounting it in the wall of the casing C is shown by way of example in Figure 7.

Figures 3 and 4 show an alternative arrangement of the jet nozzles. Here all these nozzles are placed so that the jets therefrom will be operative on the same face of the rotor. It will be seen that the one pair of nozzles $GG^1$ the jets from which are operative to effect precession in azimuth are mounted in the casing C in positions diametrically opposite with respect to and radially equidistant from the rotor axis and in a vertical direction. Similarly the nozzles $G^2G^3$ are placed diametrically opposite to each other in the horizontal direction. Solenoid-actuated valves conveniently control the flow of liquid to these jet nozzles in the same way as in the arrangement shown in Figures 1 and 2.

Where the apparatus is mounted in a sea craft either for use on the surface or submerged, it is not necessary to mount the casing C so that it may swing about a horizontal axis and thus the trunnions D may be dispensed with and the casing suitably fixed in the cradle E which can be turned in azimuth about the spindle E¹. It is then desirable, however, to exercise some control over the movements of the rotor A relatively to the driving spindle B¹ in a vertical plane, that is to say such movements as would be due to pitch of the apparatus, and this would include any list that the craft may have when turning rapidly.

The manner in which the flow of fluid jets from the nozzles G² and G³ may then be controlled is shown in Figure 5. A light fork P which is engaged by the arm A¹ of the rotor A is arranged to lie horizontally and substantially at right angles to the axis of the driving spindle B¹, and this fork is carried by a parallel linkage P¹P² mounted on a fixed member P³ which projects upwards from the plate C¹ carried by the rotor casing C. One of the links P¹ is extended as a lever P⁴ beyond the supporting member P³ having at its end an adjustable weight P⁵ by which the device can be balanced. The lever P⁴ is connected by a link P⁶ to a piston valve Q movable in a cylinder Q¹ mounted on a part of the casing plate C¹ and liquid under pressure is supplied at Q² to this cylinder. Ports in the wall of this cylinder communicate with pipes H² and H³ through which the liquid is led to the oppositely placed jet nozzles G² and G³ when the valve is suitably moved by the deviation of the rotor axis operating through the fork P and the linkage. Thus according to pitch of the craft, that is movements in a substantially vertical plane, corrections will be applied to the rotor A which so far as that vertical plane is concerned will tend to maintain the rotor axis in line with the axis of the driving spindle B¹.

It will be understood that the control of the fluid jets which determine the precession may be effected by any suitable means more especially if these valves are actuated electrically as in the construction described and shown in Figure 6.

What I claim as my invention and desire to secure by Letters Patent is:

1. Gyroscopic apparatus for use in the control of air and other craft comprising in combination a rotor, a spindle through which the rotor is driven having on the end thereof a ball on which the rotor is carried, means for driving this spindle, a support for the spindle, a base, means by which the said support is carried by the said base so that the support is movable about at least one control axis with respect to the base, at least two jet nozzles carried on the said support and through each of which fluid can be delivered in a jet directed against a face of the rotor, and valve means for controlling the delivery of fluid thereto independently of the movement of said craft.

2. Gyroscopic apparatus for use in the control of air and other craft comprising in combination a rotor with means for driving it, a base, a support for the rotor movable about at least one control axis with respect to the base, at least two jet nozzles carried on the said support and through which fluid can be delivered in a jet directed against a face of the rotor, valves controlling separately the flow of fluid from each nozzle, and electric means for actuating the valves which control the fluid flow to at least two nozzles.

3. Gyroscopic apparatus for use in the control of air and other craft comprising in combination a rotor, a spindle having on the end thereof a ball on which the rotor is carried and through which it is driven, means for driving this spindle, a casing enclosing the rotor and in which is carried the driving spindle and the means for driving it, a base, means by which the said casing is carried by the said base so that the casing is movable about at least one axis of control with respect to the base, at least two jet nozzles mounted on the said casing and in such positions that through each nozzle fluid can be delivered in a jet directed against a face of the rotor, and valve means for controlling the delivery of fluid thereto independently of the movement of said craft.

4. Gyroscopic apparatus for use in the control of air and other craft comprising in combination a rotor with means for driving it, a base, a support for the rotor movable about at least one control axis with respect to the base, means controlled by precessing of said rotor for moving the said support about each such control axis relative to the base, at least two jet nozzles carried on the said support and through each of which fluid can be delivered in a jet directed against a face of the rotor, to cause precession thereof and valve means for controlling the delivery of said fluid thereto independently of the movement of said craft.

5. Gyroscopic apparatus for use in the control of air and other craft comprising in combination a rotor, a spindle through which the rotor is driven having on the end thereof a ball on which the rotor is carried, means for driving this spindle, a support for the spindle, a base, means by which the said support is carried by the said base so that the support is movable about at least one control axis with respect to the base, at least one pair of jet nozzles carried by the said support through each of which nozzles a fluid jet can be delivered against a face of the rotor the jets from a pair of nozzles being operative to effect precession of the rotor in each direction about a control axis, and valve means for controlling the delivery of said fluid thereto independently of the movement of said craft.

6. Gyroscopic apparatus for use in the control of air and other craft comprising in combination a rotor with means for driving it, a base, a support for the rotor movable about at least one control axis with respect to the base, means for moving the said support about each such control axis relative to the base, at least two jet nozzles carried on the said support and through which fluid can be delivered in a jet directed against a face of the rotor, valves controlling separately the flow of fluid from each nozzle, and electric means for actuating the valves which control the fluid flow to at least two jet nozzles.

7. Gyroscopic apparatus for use in the control of air and other craft comprising in combination a rotor, a spindle through which the rotor is driven having on the end thereof a ball on which the rotor is carried, means for driving this spindle, a base, a support for the spindle movable about at least one control axis with respect to the base, means for moving the said support about each such control axis relative to the base, at least one pair of jet nozzles carried by the said support through each of which nozzles a fluid jet can be delivered against a face of the rotor, the jets from a pair of nozzles being operative to effect precession of the rotor in each direction about a control axis, valves controlling separately the flow of fluid from each nozzle, and electric means for actuating the valves which control the fluid flow to at least the jet nozzles forming one pair.

8. A gyroscopic apparatus for use in the control of air and other craft comprising a rotor with means for driving it, a base, and a support for the rotor including a control axis about which said support is movable with respect to the base; means for controllably precessing the rotor about said control axis comprising at least two jet nozzles carried on said support and through each of which fluid can be delivered in a jet directed against a face of the rotor, and means selectably controlling operation of the jets to cause precession of the rotor about such control axis, said selectably controlling means operating independently of extraneous forces tending to produce movement of the rotor with respect to the earth about said control axis.

9. In a gyroscopic apparatus as claimed in claim 8, means for separately controlling the flow of fluid from each nozzle.

10. A gyroscopic apparatus for use in the control of air and other craft comprising a rotor with means for driving it, a base, and a support for the rotor, including a control axis about which said support is movable with respect to the base; means for controllably precessing the rotor about said control axis comprising at least one pair of jet nozzles carried by the support through each of which nozzles a fluid jet can be delivered against a face of the rotor, the jets from the respective nozzles of each pair being operative to effect precession of the rotor in each direction about a control axis, and means selectably controlling operation of the jets to cause precession of the rotor about such control axis, said selectably controlling means operating independently of extraneous forces tending to produce movement of the rotor with respect to the earth about said control axis.

11. A gyroscopic apparatus for use in the control of air and other craft comprising a rotor with means for driving it, a base, and a support for the rotor including two axes of control lying at right angles to each other about which said support is movable with respect to the base; means for controllably precessing the rotor about said control axes comprising four nozzles carried on the support and through each of which fluid can be delivered in a jet directed against a face of the rotor, and means selectably controlling operation of the jets to cause precession of the rotor in each direction about said control axes, said selectable control means operating independently of extraneous forces tending to produce movement of the rotor with respect to the earth about said control axes.

JOHN POLLOCK BROWN.

REFERENCES CITED

The following references are of record in the file of this patent:

UNITED STATES PATENTS

| Number | Name | Date |
|---|---|---|
| 1,563,934 | Sperry | Dec. 1, 1925 |
| 2,146,620 | Brown et al. | Feb. 7, 1939 |